United States Patent
Poechmueller et al.

(10) Patent No.: US 9,785,612 B2
(45) Date of Patent: Oct. 10, 2017

(54) METHOD AND DEVICE FOR DETERMINING A RANGE OF A VEHICLE

(75) Inventors: Werner Poechmueller, Hildesheim (DE); Fanny Kobiela, Walheim (DE); Bettina Rentel, Giesen/Emmerke (DE); Michael Laedke, Hildesheim (DE); Guido Stuebner, Hannover (DE); Thorsten Mausbach, Schwieberdingen (DE); Andreas Engelsberg, Hildesheim (DE)

(73) Assignee: ROBERT BOSCH GmbH, Stuttgart (DE)

( * ) Notice: Subject to any disclaimer, the term of this patent is extended or adjusted under 35 U.S.C. 154(b) by 306 days.

(21) Appl. No.: 13/995,117

(22) PCT Filed: Oct. 20, 2011

(86) PCT No.: PCT/EP2011/068338
§ 371 (c)(1),
(2), (4) Date: Sep. 17, 2013

(87) PCT Pub. No.: WO2012/079811
PCT Pub. Date: Jun. 21, 2012

(65) Prior Publication Data
US 2014/0005879 A1 Jan. 2, 2014

(30) Foreign Application Priority Data
Dec. 17, 2010 (DE) .................. 10 2010 063 436

(51) Int. Cl.
*G06F 17/00* (2006.01)
*G01C 21/34* (2006.01)
(Continued)

(52) U.S. Cl.
CPC ......... *G06F 17/00* (2013.01); *G01C 21/3469* (2013.01); *G01G 19/086* (2013.01);
(Continued)

(58) Field of Classification Search
CPC ............ B60L 2260/52; B60L 2240/26; B60L 2260/54; B60L 2240/64; B60L 2550/14;
(Continued)

(56) References Cited

U.S. PATENT DOCUMENTS 3,543,118 A * 11/1970 Koenig ................... H02P 7/293
318/257
3,657,625 A * 4/1972 Miller ...................... B60L 7/22
318/370
(Continued)

FOREIGN PATENT DOCUMENTS

CN 101900565 12/2010
DE 197 28 769 1/1999
(Continued)

OTHER PUBLICATIONS

Besselink et al., Design of an efficient, low weight battery electric vehicle based on a VW Lupo 3L, Nov. 9-5, 2010, EVS-25.*
(Continued)

*Primary Examiner* — Thomas G Black
*Assistant Examiner* — Sara Lewandroski
(74) *Attorney, Agent, or Firm* — Norton Rose Fulbright US LLP; Gerard Messina

(57) ABSTRACT

A method for determining a range of a vehicle, the vehicle having an electric motor to supply driving power and/or to recuperate braking energy, and a weight of the vehicle is determined on the basis of an acceleration and/or recuperation behavior as a function of a torque and/or a rotational speed of the electric motor, the range of the vehicle being determined on the basis of the ascertained vehicle weight.

16 Claims, 2 Drawing Sheets

(51) Int. Cl.
*G01G 19/08* (2006.01)
*B60W 50/00* (2006.01)
*B60W 30/18* (2012.01)

(52) U.S. Cl.
CPC ....... *B60L 2240/26* (2013.01); *B60L 2240/64* (2013.01); *B60L 2260/52* (2013.01); *B60W 30/18127* (2013.01); *B60W 50/0097* (2013.01); *B60W 2530/10* (2013.01); *B60W 2550/143* (2013.01); *B60W 2550/402* (2013.01); *Y02T 10/7291* (2013.01); *Y02T 90/16* (2013.01); *Y02T 90/161* (2013.01)

(58) Field of Classification Search
CPC ......... B60L 2550/142; B60L 2550/143; B60L 2550/145; G01G 19/086; B60W 2530/10; B60W 30/18127; B60W 50/0097; G01C 21/3469; Y02T 10/7258; Y02T 10/7266; Y02T 10/7275; Y02T 10/7283; Y02T 10/7291; Y02T 90/16
USPC .......................................................... 701/22
See application file for complete search history.

(56) References Cited

U.S. PATENT DOCUMENTS

| | | | | |
|---|---|---|---|---|
| 4,548,079 A | * | 10/1985 | Klatt | B60T 8/18 701/65 |
| 5,215,154 A | * | 6/1993 | Kirby | G01G 19/03 177/136 |
| 5,537,967 A | * | 7/1996 | Tashiro | B60K 6/485 123/192.1 |
| 5,915,801 A | * | 6/1999 | Taga | B60K 6/48 303/152 |
| 6,173,226 B1 | * | 1/2001 | Yoshida | B60W 10/06 477/105 |
| 6,230,496 B1 | | 5/2001 | Hofmann et al. | |
| 6,339,749 B1 | * | 1/2002 | Rieker | G01G 19/086 701/70 |
| 6,381,522 B1 | * | 4/2002 | Watanabe | B60K 6/48 180/65.25 |
| 6,446,024 B1 | * | 9/2002 | Leimbach | B60T 8/172 702/141 |
| 7,536,272 B2 | | 5/2009 | Leminoux et al. | |
| 8,195,351 B2 | | 6/2012 | Ichinose et al. | |
| 8,380,381 B2 | | 2/2013 | Ichinose et al. | |
| 8,839,920 B2 | * | 9/2014 | Anderson | B60G 13/14 180/165 |
| 2005/0049771 A1 | | 3/2005 | Kuang et al. | |
| 2005/0143878 A1 | * | 6/2005 | Park | B60K 6/48 701/22 |
| 2007/0038357 A1 | * | 2/2007 | Leminoux | G01G 19/086 701/75 |
| 2010/0108406 A1 | * | 5/2010 | Wuerthner | B60G 17/019 177/136 |
| 2010/0138142 A1 | * | 6/2010 | Pease | B60L 11/1851 701/123 |
| 2010/0161164 A1 | * | 6/2010 | Ichinose | B60L 15/20 701/22 |
| 2010/0280700 A1 | * | 11/2010 | Morgal | G06Q 10/02 701/31.4 |
| 2011/0066322 A1 | * | 3/2011 | Karlsson | B60T 8/172 701/33.4 |
| 2011/0112710 A1 | * | 5/2011 | Meyer-Ebeling | B60L 11/1861 701/22 |
| 2011/0172877 A1 | * | 7/2011 | Dourra | F16H 59/52 701/33.4 |
| 2011/0238251 A1 | * | 9/2011 | Wright | B60L 15/20 701/22 |
| 2011/0257876 A1 | * | 10/2011 | Yokota | B60W 40/12 701/124 |
| 2011/0276206 A1 | * | 11/2011 | Tofukuji | B60L 11/185 701/22 |
| 2012/0022760 A1 | * | 1/2012 | Kato | B60T 8/1766 701/70 |
| 2012/0041627 A1 | * | 2/2012 | Kelty | B60L 11/1862 701/22 |
| 2012/0203416 A1 | * | 8/2012 | Yoshimura | B60K 6/445 701/22 |

FOREIGN PATENT DOCUMENTS

| | | | | |
|---|---|---|---|---|
| DE | 102 44 789 | | 4/2004 | |
| DE | 60 2004 003 387 | | 10/2007 | |
| DE | 10 2009 058 328 | | 7/2010 | |
| DE | 10 2009 008 327 | | 8/2010 | |
| EP | 0 903 712 | | 3/1999 | |
| FR | WO 2010043833 A1 | * | 4/2010 | ............ B60L 15/20 |
| JP | 59-160720 | | 9/1984 | |
| JP | 9-327102 | | 12/1997 | |
| JP | 2001-112121 | | 4/2001 | |
| JP | 2007-245872 | | 9/2007 | |
| JP | 2009070357 A | | 4/2009 | |
| JP | 2009120073 A | | 6/2009 | |
| JP | 2009126257 A | * | 6/2009 | ............ B60K 6/365 |
| JP | 2009-171727 | | 7/2009 | |
| JP | 2010-25910 | | 2/2010 | |
| JP | 2010-169423 | | 8/2010 | |
| JP | 2010-253978 | | 11/2010 | |
| JP | 5286323 | | 9/2013 | |
| KR | 2008-0078982 | | 8/2008 | |
| WO | WO 2010/043833 | | 4/2010 | |
| WO | WO 2010043833 A1 | * | 4/2010 | |

OTHER PUBLICATIONS

International Search Report, PCT International Application No. PCT/EP2011/068338, dated Jan. 26, 2012.

* cited by examiner

METHOD AND DEVICE FOR DETERMINING A RANGE OF A VEHICLE

FIELD

The present invention relates to a method for determining a range of a vehicle, the vehicle having an electric motor to provide driving power and/or to recover braking energy. In addition, the present invention relates to a device for determining a range of a vehicle, the vehicle having an electric motor to supply driving power and/or to recover braking energy, and at least one control unit to implement the afore-mentioned method. Moreover, the present invention relates to a motor vehicle drive train having an electric motor to supply driving power and/or to recover braking energy, and a device of the type mentioned above.

BACKGROUND INFORMATION

In the field of automotive driving technology, an electric machine is widely used as the sole drive (electrical vehicle) or it is used jointly with a drive motor of a different type (hybrid drive). In addition, the drive motor is often used to supply the driving power, and to recover braking energy in generator operation.

Because of the relatively low electrical range, hybrid vehicles and purely electrically driven vehicles require the most precise range estimate possible, so that the availability of the vehicle can be predicted and planned correctly. The range of an electric vehicle is influenced by numerous factors, e.g., the vehicle speed, gradient, electrical consumers in the vehicle.

The conventional methods for determining the range of an electric vehicle are not very precise because relevant influencing quantities are not taken into account.

Therefore, it is an object of the present invention to provide a better method and a corresponding device for determining the range of an electrical vehicle.

SUMMARY

An example method for determining a range of a vehicle is provided according to the present invention, the vehicle having an electric motor to supply driving power and/or to recover braking energy, and a weight of the vehicle is determined on the basis of an acceleration and/or recuperation behavior as a function of a torque of the electric motor, the range of the vehicle being determined on the basis of the vehicle weight.

An example device for determining a range of a vehicle is also provided, the vehicle having an electric motor to supply driving power and/or to recover braking energy, and a control unit developed to implement the afore-mentioned example method.

An example motor vehicle drive train and device is also provided, having an electric motor to supply driving power and/or to recover braking energy.

In accordance with the present invention, the range of an electrically operated vehicle is able to be determined more precisely, since a main limitation factor, or a main influencing quantity of the range—the vehicle weight—is determined and taken into account when ascertaining the range. In so doing, the behavior of the vehicle is considered when determining the vehicle weight, i.e., the acceleration and/or the recuperation behavior of the electric motor as a function of the provided torque or as a function of the torque applied by the vehicle in braking operations during generator operation. Since the vehicle weight directly affects the acceleration or deceleration behavior of the vehicle as a function of the torque, the vehicle weight is able to be determined directly from the measured data of the electric motor. Because the current vehicle weight is known as a result of the measurement and has a considerable influence on the range of the vehicle, it is possible to determine the range more precisely using the current weight data.

It is especially preferred if the range is furthermore determined on the basis of a scheduled route characteristic.

This makes it possible to consider additional important influencing parameters such as gradients and downhill slopes in the calculation, which makes the weight and thus the range determination still more precise.

It is furthermore preferred if the vehicle weight is determined also on the basis of route information, especially a gradient of the road course, a vehicle orientation and/or an altitude of the vehicle above or below NN.

This makes it possible to optimize the determination of the vehicle weight, since external influences that may lead to false interpretations are excluded.

It is furthermore preferred if the electric motor, and in particular the brake-energy recovery by the electric motor, is controlled on the basis of the determined vehicle weight.

In this way the actuation of the electric motor and, in particular, the braking instant in recuperation operation, is able to be adapted to the vehicle weight, which makes the electric drive and, in particular, the recuperation, especially efficient.

It is furthermore preferred if a chassis of the motor vehicle, and in particular damping of the chassis of the motor vehicle, is controlled on the basis of the determined vehicle weight.

In this way the vehicle dynamics are able to be controlled in a particularly precise manner, since the current vehicle weight constitutes a special influence parameter in this regard.

It is furthermore preferred if the vehicle weight is determined while considering a driving speed or an air flow, especially an air flow that is independent of the vehicle movement (direction, speed).

In this way an influence of the wind on the measurement of the vehicle weight is able to be reduced or excluded.

It is furthermore preferred if the vehicle weight is averaged across a multitude of measured values.

This minimizes measuring inaccuracies and environmental influences.

It is furthermore especially preferred if the vehicle weight is determined after an acceleration or recuperation process has been concluded.

This reduces the computational work when determining the vehicle weight from the obtained measured values.

It is furthermore preferred if the vehicle weight is made available to different control units of the motor vehicle.

This makes it possible to utilize synergies between the individual vehicle components in more optimal manner.

It is furthermore preferred if individual values of the vehicle weight are checked for plausibility and the values are discarded following a negative plausibility check, in particular.

This eliminates measuring errors and makes the determined vehicle weight more precise.

It is furthermore preferred if the vehicle weight is determined after starting the trip and interrupted or terminated if a door or a trunk of the vehicle is opened. This minimizes measuring errors caused by weight fluctuations, for instance because a person gets out or an item is removed.

It is furthermore preferred if the vehicle weight is determined under the assumption of the specific vehicle weight at the start of a trip, and, in particular, a net weight of the vehicle, an average weight of an adult person, a determined number of passengers on the basis of seat sensors or the like, and/or a particular vehicle weight of the previous ride and/or a weight determined via a learning process, which may consider the date, day of the week and/or time of day, for example, are/is used to determine the vehicle weight.

In general, the present method makes the range estimate of the vehicle more precise, without requiring an additional sensor system.

DETAILED DESCRIPTION OF EXAMPLE EMBODIMENTS

Figure 1:
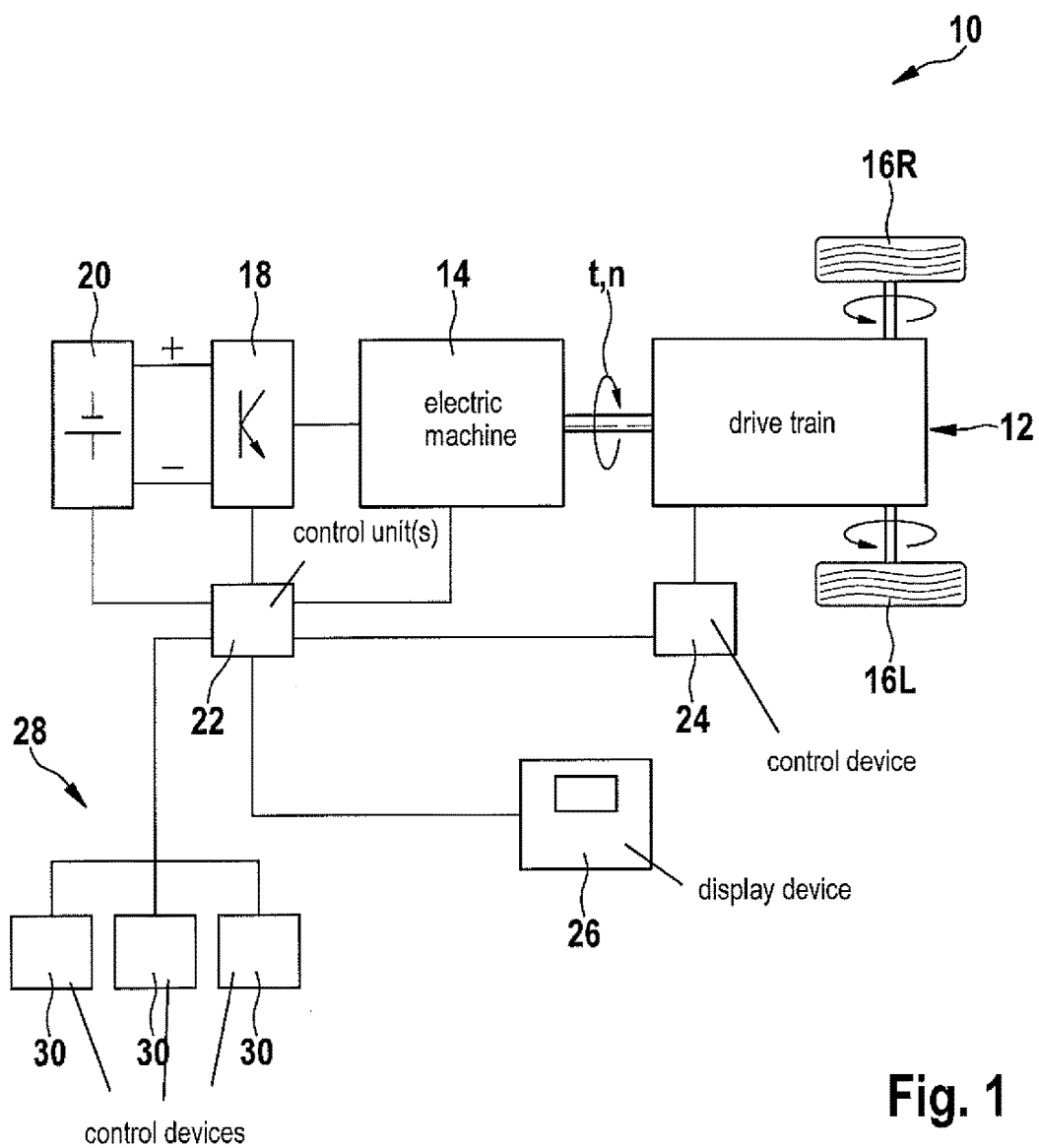
FIG. 1 in schematic form, shows a motor vehicle including a drive train, which is equipped with an electric machine and a device for actuating this machine.

FIG. 1 schematically shows a motor vehicle, which is denoted by 12 as a whole. Motor vehicle 10 has a drive train 12, which in the present case includes an electric machine 14 to provide driving power. Drive train 12 drives driven wheels 16L, 16R of vehicle 10.

Electric machine 14 supplies a torque t at an output shaft and rotates at an adjustable rotational speed n.

Drive train 12 may be set up to drive vehicle 10 on its own, with the aid of electric machine 14 (electric vehicle). As an alternative, electric polyphase machine 14 may be part of a hybrid drive train 12, and the drive train may include an additional driving motor (not denoted further in FIG. 1) such as a combustion engine or the like. In such a case, the drive train may additionally include a transmission and the like.

Drive train 12 and electric machine 14 may be set up to generate electric energy in overrun operation and/or during braking processes in generator operation of electric machine 14.

Electric machine 14 is actuated by means of power electronics 18. The power electronics are connected to an energy supply 20, such as an accumulator 20 of vehicle 10, and used to convert a direct voltage supplied by accumulator 20, for instance into a three-phase alternating current or into a single-phase alternating current, in order to supply electric machine 14 with electric energy. Furthermore, power electronics 18 is set up to convert recuperation energy generated by electric machine 14 into a direct voltage and to use it to recharge accumulator 20. In addition, motor vehicle 10 has one or more control unit(s) 22, which are/is connected to accumulator 20, power electronics 18, and electric machine 14. Control unit(s) 22 control(s) electric machine 14 via power electronics 18 and furthermore record(s) measured values of electric machine 14, power electronics 18 and accumulator 20. Moreover, control unit(s) is/are connected to a control device 24, which is set up to control additional components of drive train 12 and/or to record measured values of drive train 12. In addition, control unit(s) 22 is/are connected to a display device 26, which is set up to inform the driver about the vehicle state or the like. Furthermore, via a network 28 of vehicle 10, control unit(s) 22 is/are connected to additional control devices and/or sensors, which are denoted by 30 in general in FIG. 1. Control unit(s) 22 provide(s) measured values to other control devices 30, via network 28. Control unit(s) 22 receive(s) data and measured values from the control devices and/or sensors 30, via network 28, in order to optimize calculations on the basis of additional data. A special synergy effect of the different control devices 30 in motor vehicle 10 is achievable in this manner.

A weight of vehicle 10 is determined on the basis of an acceleration and/or recuperation behavior of electric machine 14, as a function of torque t and/or rotational speed n. In addition, control device(s) 22 record(s) the charge state of accumulator 20 and is/are able to determine the available electric energy in this manner. Based on the vehicle weight and the charge state of accumulator 20 as well as potential additional data, e.g., the energy consumption and environmental conditions, control device(s) 22 determine(s) a range of vehicle 10 and display(s) the determined range via display device 26.

Via network 28, measured values and sensor data of the control devices or sensors 30 are available to control device(s) 22 for determining the vehicle weight. These data or measured values are, for example, the route course, vehicle speed, gradient, vehicle orientation, altitude of the vehicle above/below NN, air flows, and the number of vehicle passengers, via seat sensors. Control device(s) 22 then use(s) these data to determine a more precise vehicle weight and a range of vehicle 10 and display(s) the range via display unit 26.

Figure 2:
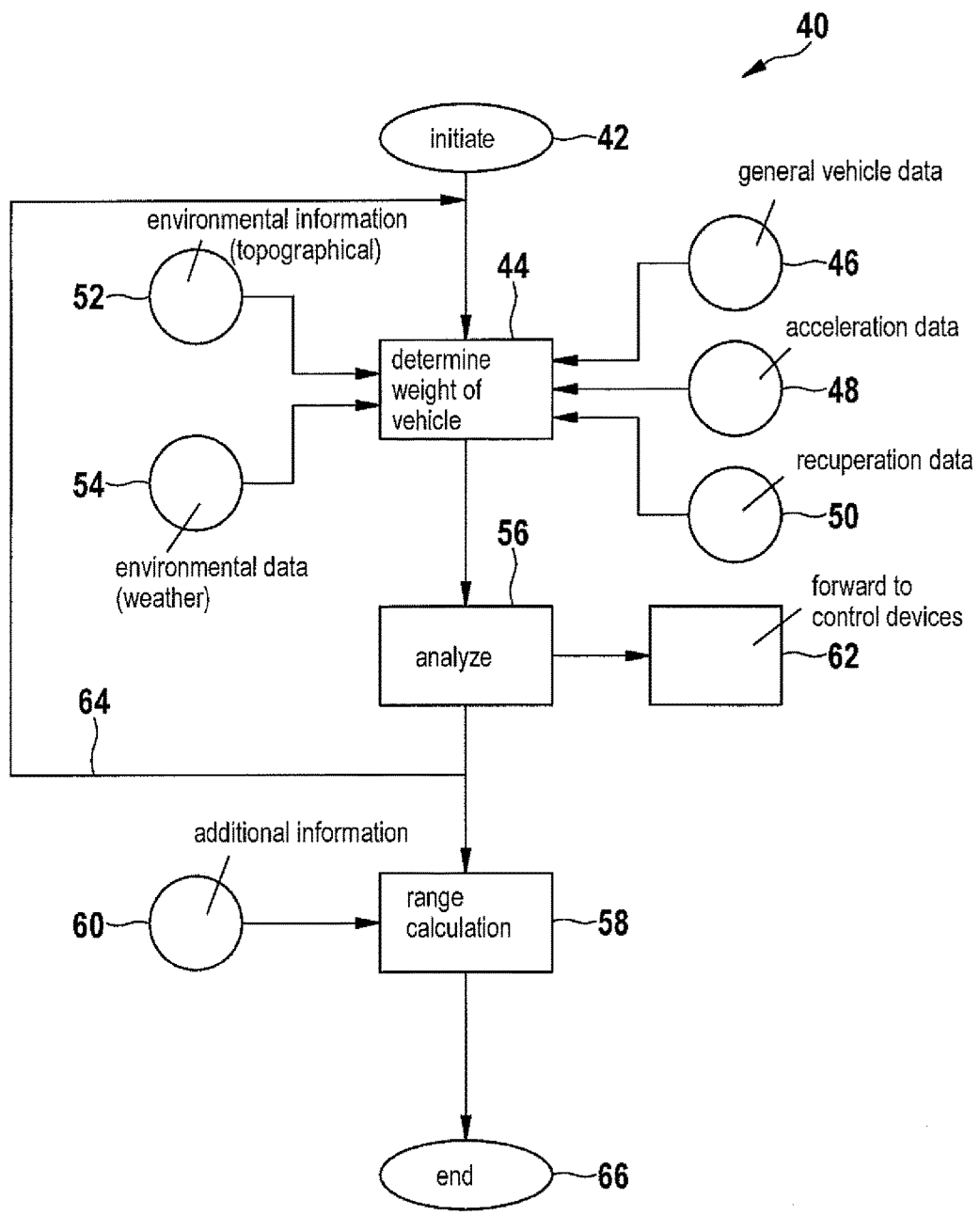
FIG. 2 in schematic form, shows a flow chart of an example method for determining a range of a vehicle.

FIG. 2 shows a schematic flow chart of a method for determining the range of vehicle 10.

The method shown in FIG. 2 is basically denoted by 40. Method 40 is initiated at 42, which, for example, may be done by operating an ignition of vehicle 10.

At 44, the weight of vehicle 10 is determined, namely on the basis of general vehicle data 46, acceleration data 48, and/or recuperation data 50 as well as environmental information 52, e.g., topographical data of the navigation system and environmental information 54 such as weather data. The general vehicle data are machine torque t, engine speed n, and the vehicle speed. Acceleration data 48 are made up of requested torque t, the vehicle acceleration and the reduction in the charge energy, in order to determine the weight of vehicle 10. As an alternative, recuperation data is able to be utilized during recuperation operation of electric drive 14. These recuperation data 50 are the requested deceleration of vehicle 10, the recuperative braking portion, possibly the portion of additional brake systems, the vehicle deceleration and the increase in charge energy of accumulator 20. As a result, the weight of vehicle 10 is able to be determined from these recuperation data 50, either in addition or as an alternative Furthermore, topographical data 52, such as from a navigation system, are used to estimate the vehicle weight. These topographical data 52 are, for example, the gradient of the travel route, the altitude of the vehicle above/below NN, and the vehicle orientation.

Moreover, weather data 54 are used to calculate or estimate the vehicle weight, such as the wind direction and intensity, altitude of the air flow and air pressure, as well as measurements taken by the vehicle itself, such as the air flow at different speeds. These data 46 through 54 are utilized to determine or estimate the vehicle weight. The determined or estimated vehicle weight is analyzed at 56. To analyze the vehicle weight, different values, determined sequentially, are averaged and, depending on the individual case, either discarded on the basis of environmental data 52, 54, or weighted to a greater or lesser extent on the basis of supplementary data 46 through 54. This minimizes measuring errors and measuring inaccuracies or environmental influences, so that the determination of the vehicle weight becomes more precise. Based on environmental data 52 and weather data 54, a quality or precision of the determined or estimated weight is able to be ascertained. The determined vehicle weight is forwarded to a range calculation, which is shown at 58. Additional information 60 is provided to determine the range. Additional information 60 may be the charge state of accumulator 20 and a scheduled route course of vehicle 10. When determining the range, the quality or precision of the weight determination is taken into account as well. The determined vehicle weight is furthermore forwarded to additional control devices 30 of vehicle 10, as shown at 62. This makes it possible to supply the vehicle weight to other control devices 30, e.g., to the control of electric drive 14 or to the chassis control, in order to determine, for example, an optimal braking point for the greatest utilization of the recuperation potential at a given vehicle weight, or else, to adapt active damping of the chassis in order to achieve improved driving dynamics.

The determination of the vehicle weight and the analysis of the weight value are repeated in stepwise manner, as shown at 64, in order to optimize the measurement. The range determination, shown at 58, takes place on a regular basis based on the updated analyzed data, which are analyzed at 56.

Entire method 40 ends at 66, usually when the ignition of vehicle 10 is switched off or when a door or the trunk is opened, based on the assumption that this allows weight to be removed or added.

To limit the computational work, all measured data are preferably collected across a particular time interval, especially across a complete acceleration or recuperation process, and stored in a volatile or non-volatile memory of motor vehicle 10. Once the particular acceleration or recuperation process has been concluded, the vehicle weight is determined or estimated according to method 40.

In addition, the determined vehicle weight, which may be used as starting weight when setting off for the next trip at 42, is stored in a nonvolatile memory at the end of method 40, which is shown at 66.

Moreover, the determined weight values are stored in another non-volatile memory in order to make them available to the analysis, which is shown at 56.

At the start of the method at 42, a specific vehicle weight is normally assumed, e.g., on the basis of the net weight of the vehicle plus an average weight of an adult person in the corresponding region, and a determination of the number of passengers, e.g., via seat sensors and taking the estimated vehicle weight of the last drive into account. Furthermore, a typical vehicle weight may be determined via a learning process, for instance, via vehicle weights at certain times of the day, at a certain date, a weekday and the like. It is also possible to store and use the estimated vehicle weight across a longer period of time and a plurality of preceding drives.

What is claimed is:

1. A motor vehicle drive train, comprising:
   an electric motor to provide at least one of driving power, and to recuperate braking energy; and
   a device for determining a range of a vehicle, the vehicle having an electric motor to supply at least one of driving power and to recuperate braking energy, and at least one control unit, the control unit designed to determine a weight of the vehicle as a function of recuperation data, and to determine a range of the vehicle from the determined vehicle weight,
   wherein brake energy recuperation by the electric motor is controlled on the basis of the determined vehicle weight,
   wherein the brake energy recuperation by the electric motor recharges an accumulator of the vehicle, and
   wherein the recuperation data includes the following: 1) a requested deceleration of the vehicle, 2) a recuperative braking portion of additional braking systems, 3) an actual deceleration of the vehicle, and 4) an increase in charge energy of the accumulator of the vehicle.

2. The motor vehicle drive train as recited in claim 1, wherein the weight of the vehicle is also determined as a function of at least one of: i) an acceleration behavior, ii) a machine torque, and iv) a rotational speed of the electric motor.

3. A device for determining a range of a vehicle, the vehicle having an electric motor to supply at least one of driving power and to recuperate braking energy, and at least one control unit, the control unit designed to determine a weight of the vehicle as a function of recuperation data, and to determine a range of the vehicle from the determined vehicle weight,
   wherein brake energy recuperation by the electric motor is controlled on the basis of the determined vehicle weight,
   wherein the brake energy recuperation by the electric motor recharges an accumulator of the vehicle, and
   wherein the recuperation data includes the following: 1) a requested deceleration of the vehicle, 2) a recuperative braking portion of additional braking systems, 3) an actual deceleration of the vehicle, and 4) an increase in charge energy of the accumulator of the vehicle.

4. The device as recited in claim 3, wherein the weight of the vehicle is also determined as a function of at least one of: i) an acceleration behavior, ii) a machine torque, and iv) a rotational speed of the electric motor.

5. A method for determining a range of a vehicle, the vehicle having an electric motor to provide driving power and to recover braking energy, the method comprising:
   determining a weight of the vehicle as a function of recuperation data; and
   determining the range of the vehicle from the determined vehicle weight,
   wherein brake energy recuperation by the electric motor is controlled on the basis of the determined vehicle weight,
   wherein the brake energy recuperation by the electric motor recharges an accumulator of the vehicle, and
   wherein the recuperation data includes the following: 1) a requested deceleration of the vehicle, 2) a recuperative braking portion of additional braking systems, 3) an actual deceleration of the vehicle, and 4) an increase in charge energy of the accumulator of the vehicle.

6. The method as recited in claim 5, wherein the weight of the vehicle is also determined as a function of at least one of: i) an acceleration behavior, ii) a machine torque, and iv) a rotational speed of the electric motor.

7. The method as recited in claim 5, wherein the vehicle weight is determined under an assumption of a specific vehicle weight at a start of a trip, at least one of the following is used to determine the vehicle weight:
   i) at least one of a net weight of the vehicle, an average weight of an adult person, a determined number of passengers based on seat sensors, and a particular vehicle weight of the previous ride, and
   ii) a weight determined via a learning process.

8. The method as recited in claim 5, wherein the vehicle weight is determined after a vehicle has started and is one of interrupted or terminated when a door or a trunk of the vehicle is opened.

9. The method as recited in claim 5, wherein the vehicle weight is made available to different control devices of the motor vehicle.

10. The method as recited in claim 5, wherein determined values of the vehicle weight are checked with regard to plausibility and, based on the check, are either taken into account in unchanged form, at modified weightings, or are not taken into account at all.

11. The method as recited in claim 5, wherein the vehicle weight is determined after one of an acceleration or recuperation process has been concluded.

12. The method as recited in claim 5, wherein the vehicle weight is averaged across a plurality of measured values of the vehicle weight.

13. The method as recited in claim 5, wherein damping of a chassis of the motor vehicle is controlled on the basis of the vehicle weight.

14. The method as recited in claim 5, wherein the vehicle weight is determined taking one of a vehicle speed, or an air movement, into account.

15. The method as recited in claim 5, wherein the vehicle weight is determined as a function at least one of: route information, a gradient of a road course, a vehicle orientation, and an altitude of the vehicle above or below NN.

16. The method as recited in claim 5, wherein the range is additionally determined as a function of a scheduled or likely route course.

* * * * *